United States Patent [19]

MacLaughlin

[11] Patent Number: 4,613,746
[45] Date of Patent: Sep. 23, 1986

[54] METHOD AND APPARATUS FOR AUTOMATICALLY CONTROLLING THE TEMPERATURE OF A HEATER ELEMENT

[75] Inventor: Donald N. MacLaughlin, Midland, Mich.

[73] Assignee: Cosden Technology, Inc., Dallas, Tex.

[21] Appl. No.: 742,372

[22] Filed: Jun. 7, 1985

Related U.S. Application Data

[63] Continuation of Ser. No. 487,408, Apr. 21, 1983, abandoned.

[51] Int. Cl.⁴ .............................................. H05B 1/02
[52] U.S. Cl. .................................... 219/490; 219/497; 219/501; 53/478
[58] Field of Search ............... 219/491, 490, 489, 494, 219/510, 497, 501, 514, 519; 53/478, 477, 329, 75; 156/256

[56] References Cited

U.S. PATENT DOCUMENTS

| Re. 29,448 | 10/1977 | Brown et al. | 156/256 |
|---|---|---|---|
| 3,588,445 | 6/1971 | Hopkins | 219/501 |
| 3,645,825 | 2/1972 | Gaunt et al. | 53/478 |
| 3,898,423 | 8/1975 | Taylor et al. | 219/491 |
| 4,161,644 | 7/1979 | Yanagawa et al. | 219/492 |
| 4,176,507 | 12/1979 | Mancini | 53/478 |
| 4,354,095 | 10/1982 | de Vries | 219/494 |

*Primary Examiner*—M. H. Paschall
*Attorney, Agent, or Firm*—Schwartz, Jeffery, Schwaab Mack, Blumenthal & Evans

[57] ABSTRACT

A method and apparatus for controlling the temperature of a heater element in accordance with the dwell time of an item to be heated by the heater element. The apparatus of the invention utilizes a temperature tracking circuit which is energized by a low voltage DC power source and a switching system for operating the tracking circuit in either an automatic or standby mode. Sensors are provided for determining the dwell time of an article to be heated by the heater element and a thermocouple or the like is provided for sensing the temperature of the heater element. A heat controller, preferably of the digital programmable variety, is connected to the heater element and is responsive to the dwell time and the thermocouple for controlling the power to the heater in accordance with the dwell time and instantaneous heater temperature whenever the equipment associated with the heater element is operating in the automatic mode. Interposed between the programmable heat controller and the heater element may be a power control device which is responsive to the output of the programmable heat controller for supplying a regulated portion of a high voltage power source to the heater element. In either the automatic or the standby mode, a signal is inputted to the programmable heat controller for maintaining the heater element above a predetermined minimum temperature.

6 Claims, 2 Drawing Figures

METHOD AND APPARATUS FOR AUTOMATICALLY CONTROLLING THE TEMPERATURE OF A HEATER ELEMENT

This application is a continuation of application Ser. No. 487,408 filed Apr. 21, 1983 now abandoned

BACKGROUND OF THE INVENTION

1. Field of the Invention

The present invention relates to an automatic control for a platen heater and more particularly to automatic control for regulating the platen heat in a lid applying apparatus.

2. Background and Prior Art

It is well known in the container art to apply foil caps on containers by use of a platen heater which seals the foil to the container. The platen is used to activate a hot melt, in the form of glue or shellac or the like, onto the side of the container. Proper sealing can only be accomplished when the hot melt is triggered at a high enough temperature and absorbs enough heat to effect the proper seal. In that regard, there is a time and temperature correlation which is necessary in order to be certain that the seal is effective to prevent the container contents from leaking, spilling, spoiling, etc.

Two conditions must be ensured in order to be certain an adequate seal has been effected. Temperature of the heater platen must be high enough and the foil must experience the heater platen temperature for a sufficiently long period of time to absorb enough heat energy. The time during which the foil cap is in contact with the heater platen is hereinafter referred to as the dwell time.

In prior art container manufacturing devices, such as that disclosed in Reissue Pat. No. 29,448, the disclosure of which is hereby incorporated by reference after a container was assembled and filled in various rotating stations, it would pass through a cap application station. Automatic container forming and filling devices such as that disclosed in the above-referenced patent are capable of producing 350 or more containers per minute. When operating at a low speed, the heater platen could be operated at a temperature which was just sufficient to activate the hot melt, for example, 240° to 280° F. That is because at low speeds, the foil could absorb enough heat from the platen to effect a good seal. As the speed of production increases, in order to ensure that the heater platen would transfer enough heat to the foil cap, its temperature must be increased since the dwell time of each foil cap on the platen is significantly less. Therefore, as the speed of production of the machine is increased, it is also necessary to increase the temperature of the platen correspondingly in order to ensure proper sealing. Unfortunately, it is all too common for machine operators to increase the rate of production of the machine without appropriately adjusting the temperature of the heater platen thereby producing defectively sealed containers.

In addition, in the prior art equipment, when the sealing station is shut down, for example during a lunch break, the heater platen temperature tends to decrease towards ambient. After the machine is restarted, owing to the significant thermal inertia of the platen, it ordinarily takes up to 15 minutes before the platen becomes hot enough to again produce properly sealed container caps. If production is recommenced before the platen temperature is adequate to activate the hot melt on the foil, the initial machine production may all have defectively sealed caps. In a fast operating machine, this could mean that literally thousands of containers filled with merchandise are defectively sealed.

SUMMARY OF THE INVENTION

It is therefore an object of the present invention to provide an automatic heat control for a heater platen.

It is a further object of the present invention to provide a control for a heater platen that can operate in either an automatic or a standby mode.

It is a still further object of the present invention to provide a control for a heater platen for a cap sealing machine that is responsive to the speed of production of the machine while operating in the automatic mode and which is operative to maintain the heater platen at a desired heat level, which at all times is maintained above a minimum heat level, when in the standby mode.

These as well as other objects and advantages are achieved in accordance with the present invention as broadly embodied and disclosed herein which comprises a temperature tracking circuit for controlling the temperature of a heated element. The circuit comprises a power source for energizing the tracking circuit and a switching system for operating the tracking circuit in either an automatic or standby mode. Means are provided for determining the dwell time of an article to be heated by the heater element in accordance with the rate of production of the equipment associated with the heater element. In addition, a temperature sensor such as a thermocouple is provided for sensing the temperature of the heater element. Signals representing the dwell time and the heater element temperature are inputted into a heat controller which is connected to the heater element for controlling the power admitted to the element in accordance with the dwell time and the instantaneous heater element temperature when the heater element is operated in the automatic mode. Advantageously, a power control device responsive to the heat controller may be positioned between the heat element and the controller for supplying a regulated portion of a high voltage power source to the heater element to maintain its heat level. Preferably, a signal is inputted into the heat controller to maintain the heater element above a predetermined minimum temperature whenever the heater is operated in either the automatic or standby mode.

Preferably, a separate control is provided for the heat controller and is activated through the switching system for controlling the temperature of the heater element during operation in the standby mode so that the heater element will be maintained at the same temperature as it was operating at in the automatic mode during standby operation. In this way when the equipment with which the heater is associated is restarted, the heater element will already be at the required operating temperature.

In accordance with a preferred embodiment of the invention, the device for determining the dwell time may comprise a sensor which produces a signal proportional to the dwell time and a converter for transforming the signal into a DC input signal for the heat controller. Such a sensor may comprise a magnetic sensor which is responsive to the passage of a rotating element whose rotational speed is proportional to the rate of production of equipment and thereby to the dwell time. Preferably, the power source which energizes the control circuit is a low voltage DC power source. For many applications, it is also advantageous to provide a meter which is adapted to be connected to the heat controller for providing the operator with an indication signal which is proportional to the temperature at which the controller is regulating the heater. Such a meter may be in the form of a milliameter which measures the input current to the heat controller since the current input is directly proportional to the desired temperature of the heater element.

Also disclosed herein is a method of controlling a temperature of a heater element in accordance with the dwell time of an article or item to be heated by the element. The method comprises determining the dwell time of the item to be heated by the element with the element and then sensing the temperature of the element and controlling the power to the element in accordance with the sensed dwell time and the element temperature whereby as the dwell time decreases, the temperature will increase so that the item to be heated absorbs at least a predetermined amount of heat energy when the equipment associated with the heater element is operated in its automatic mode.

The method will also advantageously include the step of maintaining the temperature of the heater element above a predetermined minimum temperature regardless of the dwell time.

BRIEF DESCRIPTION OF THE DRAWINGS

The accompanying drawings, which are incorporated in and form a part of the specification, illustrate the presently preferred embodiment of the present invention and, together with the description, serve to explain the principles of the invention. In the drawings.

DETAILED DESCRIPTION OF THE INVENTION

Figure 1:
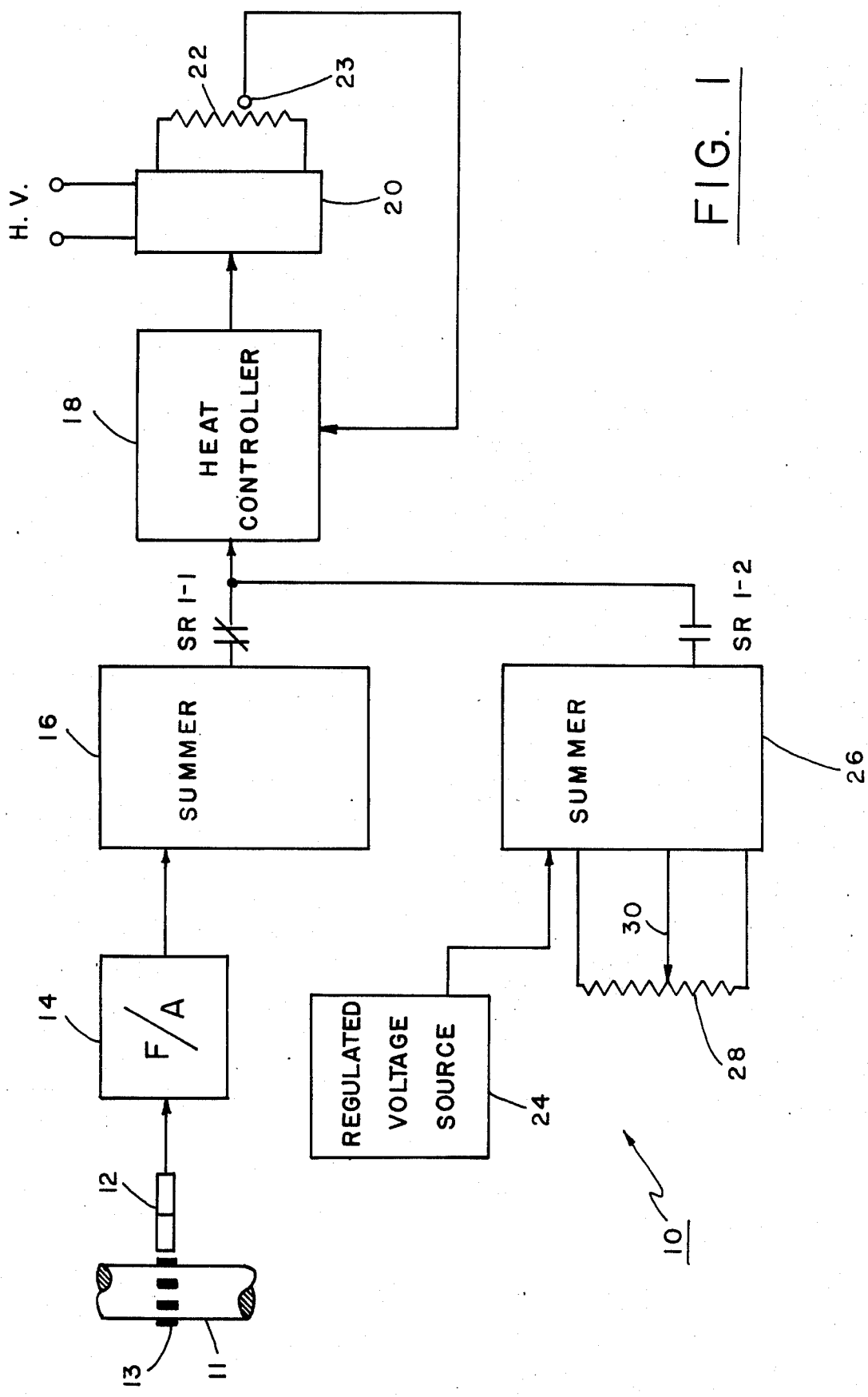
FIG. 1 represents a block schematic diagram of an automatic heater control in accordance with the present invention.

Reference will now be made in detail to the present preferred embodiment of the invention, an example of which is illustrated in the accompanying drawings. Turning first to FIG. 1 there is illustrated a member 11 of a rotating element of a cap sealing machine or the like. The member 11 may be a rotating element of a feed member for the sealing station, or a rotating element of the filling station or the like in the apparatus of Re. 29,448 whose output is equivalent to rate of the feed of sealing caps to the sealing station. Alternatively, it may be any other element whose speed corresponds to the rate of feed to the sealing station of the spinwelder. Means are provided for determining the speed of rotation of the member 11. Such means may comprise a magnetic pickup 12 or the like which senses the passage of magnetic elements 13 on the rotating member 11. It should be understood that while the embodiment described contemplates a rotating cap sealing station, any throughput type of production station may be utilized within the spirit and scope of the invention and the member 12 may then comprise any means which will function to register the rate of production. In any event, the signals generated by the sensor 12 are fed to a frequency to analog converter 14 which may be of the type supplied by Red Lion Controls Corporation of York, Pennsylvania, which is capable of receiving an input signal of from 0 to 10 kilocycles and generating a corresponding output voltage of 0 to 10 volts DC at a current level of about 10 milliamps. The output from the converter 14 is fed through a summer 16 and a normally open switch $SR_{1\text{-}2}$ to a programmable heat controller 18 which may be a digital temperature controller of the type supplied by Watlow Winona, Inc. of Winona, Minnesota. Such a controller is capable of providing a signal of from 0 to 10 volts and temperature control in the range of from 0 to 1,000° F. The output from the programmable controller 18 is fed into a power control device 20 which controls the amount of power to the heater platen 22 which is shown to be of the electrical-resistive type. The power control device may be a single phase, zero feed power controller of the type sold by Halmar Electronics, Inc. of Columbus, Ohio. A means to sense the temperature of the heater platen 22 such as a thermocouple 23 may be provided in order to send a feedback signal to the programmable heat controller 18.

For most applications, it is desirable that the heater platen never go below a minimum temperature, for example, 150° F. For this reason, a regulated voltage source 24 may be provided to provide a minimum voltage bias to summer 16 which will at all times maintain the heat controller input so that the platen temperature will not drop below the minimum temperature of, for example, 150° F.

In order to maintain the platen temperature at the desired sealing temperature during standby operation when the signal from the converter 14 drops to zero, a standby mode circuit is provided. A summer 26 receives an input voltage corresponding to the minimum heater platen temperature (i.e., the output of the regulated voltage source) and, an additional incremental voltage in order to maintain the heater platen temperature at the proper temperature for sealing containers as soon as production is restarted. This incremental voltage may be provided by means such as a potentiometer 28 with a wiper arm 30 which correspond to the speed control on the associated container production equipment. In other words, if the container filler equipment had been set at 350 containers per minute, the voltage to the summer 26 from the potentiometer 28 would correspond to a heater platen temperature for that production rate. Whenever the cap sealing apparatus is in the standby mode, the normally closed switch $SR_{1\text{-}1}$ is closed and the normally opened switch $SR_{1\text{-}2}$ is opened to thereby switch the programmable heat controller input from the automatic to the standby mode.

Figure 2:
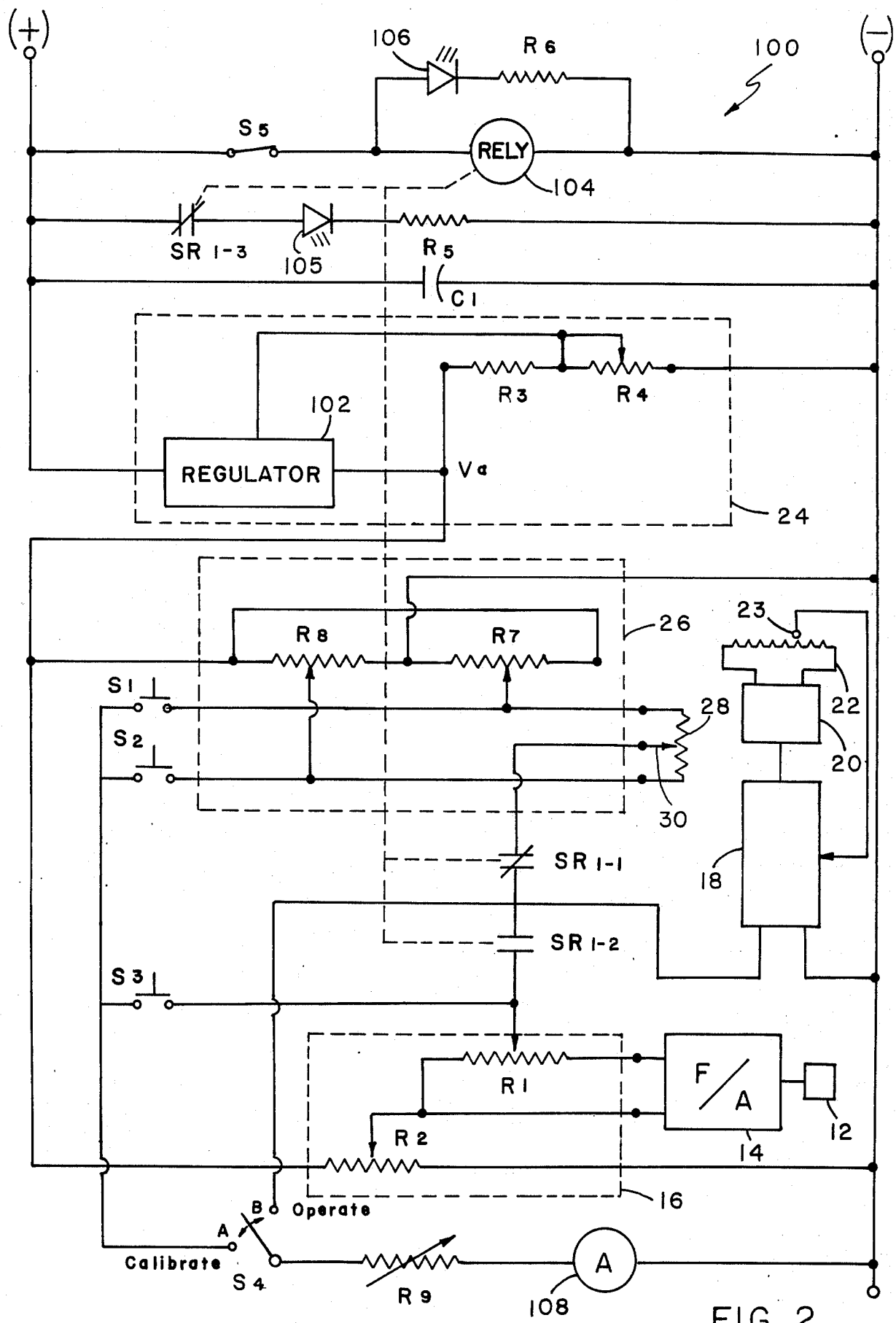
FIG. 2 illustrates a schematic diagram of the automatic heater control of FIG. 1.

Reference will now be made to the circuit of FIG. 2 which depicts the temperature tracking system of FIG. 1 in detail. In FIGS. 1 and 2, similar elements are correspondingly numbered. As with FIG. 1, means are provided in order to track the speed of production of the lid applying apparatus or other production station associated with the heater platen 22. Such means may include a hall effect sensor 12 or the like which produces a signal corresponding to the speed of rotation (or production) of a passing member. The signal from the sensor 12 is passed to a frequency to analog converter 14 to produce a DC signal which is proportional to the sensor signal. It should be understood that where the associated equipment utilizes rotating production stations, the sensor 12 may simply sense the speed of rotation. However, where non-rotating production stations are used, the sensor may simply respond to the passage of an element such as a container or the like or to the motion of an element of the equipment which is indicative of the production rate. The output from the converter 14 is fed to the summer 16 and through a normally open switch $SR_{1-1}$ to the programmable heat controller 18. The operation of the summer 16 will be further described below.

The output of the programmable heat controller 18 is connected to a voltage power control device 20 which regulates the power to the heat platen 22. The heater platen 22 has an associated thermocouple 23 which provides a feedback signal for the programmable heat controller 18 indicative of the actual temperature of the platen 22. As will be apparent to the artisan, the system provides closed loop control of the heater platen by the programmable heat controller in accordance with the input signal to the controller. The signal taken from the wiper arm of the resistor $R_1$ of the summer 16 corresponds proportionally to the output of the converter 14 and is therefore indicative of the rate of production associated equipment. Thus, the temperature at which the platen 22 is maintained, when the machine is in the automatic mode as described hereinbelow, will always track the rate of production of the equipment and thereby ensure that each of the foil caps absorbs enough heat to effect a proper seal with the container.

It has been found that it is desirable to maintain the heater platen at a minimum temperature of on the order of 150° F. regardless of how low the rate of production falls. For this purpose, an additional voltage is supplied to the summer 16 which corresponds to the minimum desired heater platen temperature. A regulated voltaqe source 24 supplies this minimum voltage to the resistor $R_2$ of the summer 16. The sum of the voltages from the ganged resistors $R_1$ and $R_2$ of the summer 16 are fed through normally open relay switch $SR_{1-2}$ to the programmable heat controller 18 to control power to the heater platen 22.

The regulated voltage source 24 supplies a highly regulated voltage to eliminate any voltage excursions in the power supply (±). The power supply is preferably a low voltage DC power source for example, 12 volts DC. In order to be sure that the regulator will function effectively to maintain a constant voltage, its output is set at a level considerably below that of the power source. In the present example, where the power source is 12 volts DC, the regulated voltage will be on the order of 5 volts DC. The voltage source consists of a regulator 102 and a voltage divider network consisting of resistor $R_3$ and potentiometer $R_4$. The regulator 102 may comprise a standard 3-pin power regulator chip such as those available from Allied Electronics. The resistor $R_4$ is used to set the voltage $V_a$ which, as described hereinbelow, not only provides the bias voltage for the resistor $R_2$ of the summer 16 but also provides the calibration voltage for the entire temperature tracking system. As will be understood by the artisan, the potentiometer $R_4$ may be set to provide the desired voltage $V_a$ and then sealed at the factory or, where user variations may be desired, the resistor $R_4$ may be in the form of a user accessible potentiometer. It should also be understood that the entire regulated voltage source 24 can be replaced by any equivalent precisely regulated source such as a battery or the like.

When the temperature tracking circuit is in the automatic mode, the normally closed switch $SR_{1-1}$ is opened and the normally opened switch $SR_{1-2}$ is closed. At the same time, the normally closed relay switch $SR_{1-3}$ is opened. Relay switch $SR_{1-3}$ is part of the standby indicator system which may comprise a light emitting diode 105 and a current limiting resistor $R_5$. The standby indicator is energized whenever the normally closed switch $SR_{1-3}$ is not opened by relay 104 (i.e., whenever switch $S_5$ is open). Means are also preferably provided to indicate when the temperature tracking module is operating in the automatic mode. Such means may comprise light emitting diode 106 and current limiting resistor $R_6$ which are connected between the high and low terminals of the power supply through the switch $S_5$ which is closed when operating in the automatic mode. A capacitor C1 may also be provided across the terminals of the low voltage power source in order to absorb any back EMF generated by the relay 104 and in order to absorb any voltage spikes from the low voltage power source which would otherwise be transmitted to the regulator 102.

The standby portion of the heater platen control system will now be described. The output $V_a$ from the regulated voltage source 24 is supplied to the potentiometer network $R_7$ and $R_8$. This resistor network $R_7$ and $R_8$ functions as a summer whose output voltage is supplied to the programmable heat controller through the switch $SR_{1-1}$ which is normally closed and which remains closed when the system is in the standby mode. Resistor $R_7$ functions to supply a minimum voltage to the heat controller 18 in a manner similar to the resistor $R_2$ of the summer 16. The voltage tapped off of resistor $R_7$ will ensure that the heater platen temperature does not fall below a minimum temperature of, for instance, 150° F. The resistor $R_8$ may be used to set the maximum temperature at which the heater platen can be maintained in the standby mode. This temperature may be, for instance, in the range of 350° F. In order to set a heater platen temperature which is between the minimum and maximum temperatures as set by resistors $R_7$ and $R_8$, respectively, and which corresponds to the desired heater platen temperature when the machine is restarted from the standby mode, a resistor $R_{28}$ with wiper arm 30 is provided. The resistor $R_{28}$ and wiper arm 30 may be the same as the speed control elements used to control a portion of the associated container production equipment such as the filling station upstream of the capping station as indicated in U.S. Pat. No. RE 29,448. Alternatively, the resistor 28 and the wiper arm 30 may merely be ganged to some production rate control element so as to set the standby temperature of the heater platen at the temperature which will be required when the machine is restarted to begin production at the same rate it was producing when last shut down. For example, if the machine was operating at a rate which required the heater platen to be maintained at a temperature of 280° F., the voltage output from the summer 26 would equal a voltage which corresponded to a heater platen temperature of 280° F. Therefore, during restart, for instance after a lunch break or the like, the initial production after the equipment was returned to automatic mode would find the heater platen at the proper temperature for immediate production since it was maintained at that temperature during shutdown. Therefore, every container will have properly sealed caps with no need to wait for any warmup period to expire.

The manner in which the system is calibrated will now be described in detail. Initially, the potentiometer $R_4$ is set to achieve the proper desired output voltage from the regulated voltage source 24. A voltage of for instance 5 volts is sufficient to bias the summing networks 16 and 26. As mentioned hereinabove, the potentiometer $R_4$ may be user accessible or in some cases may be set at the factory and then sealed. Next, the bias button $S_1$ is depressed with the production rate controls 28 and 30 in the zero production position. With the production potentiometer so set, the resistor $R_7$ can be set so that the platen temperature will at all times to remain above a predetermined minimum, for example, 150° F. This setting can be determined by moving the switch $S_4$ to the calibrate position and adjusting the potentiometer $R_7$ until the milliameter 108 indicates a current value which corresponds to the desired minimum temperature.

Next, the production speed potentiometer 28 is set to maximum speed and the standby button $S_2$ is depressed. Potentiometer $R_8$ is then adjusted until the output of the milliameter reads a current which corresponds to the maximum platen temperature desired, for instance, 350° F.

It should now be apparent that as the resistor 28 is swept by the arm 30, the output to the programmable heat controller 18 will vary the heater platen temperature between the minimum and maximum temperature settings as determined by potentiometers $R_7$ and $R_8$. While 150° F. and 350° F. have been indicated as the minimum and maximum heater platen temperatures desired, it should be apparent to the artisan that the system can, of course, be set for any other range of temperatures which may be desired for other particular applications.

Next, the autobutton $S_5$ is depressed, and with the output of the FA converter 14 at zero, the potentiometer $R_2$ is adjusted for an output corresponding to the minimum desired heater platen temperature, in the present example, 150° F. Next, the filling and capping equipment is turned on to operate at full speed or an equivalent full speed signal is impressed at the output of the converter 14 and the potentiometer $R_1$ is set so that the total output voltage across potentiometers $R_1$ and $R_2$ is equal to the desired maximum heater platen temperature, which in the present example is 350° F. The temperature tracking circuit is now set to operate in both the automatic and standby modes. After calibration and during operation, in order to indicate to the equipment operator the temperature at which the programmable heat controller is being regulated, the switch $S_4$ may be switched from the calibrate or A position into the operate or B position. In this position, the current reading of the ammeter 108 is directly proportional to the setting of the heater platen temperature. The ammeter may therefore be calibrated on its face either in milliamps or in temperature degrees assuming the characteristics of the heater platen, the power control device and the programmable heat controller are all known. The resistor $R_9$ is merely a current limiting resistor which can also be used to calibrate the ammeter 108.

The foregoing description of a preferred embodiment of the invention has been presented for purposes of illustration and description. It is not intended to be exhaustive or to limit the invention to the precise form disclosed, and obviously many modifications and variations are possible in light of the above teaching. For instance, while the above teaching uses as an example container production equipment having a foil lid applying station utilizing a heater platen, it should be apparent that the present invention will have the utility in any instance where an output temperature must be maintained proportional to a dwell time or otherwise be time proportional. For instance, applications such as the pumping, mixing and heating of chemical solutions may utilize such a temperature tracking system. Moreover, it should be apparent that for some specific applications, many of the adjustable potentiometers can be replaced by fixed resistances and that no calibration system will be necessary. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed:

1. A spinwelder device comprising:
    (a) a rotating feed element for feeding containers to a sealing station;
    (b) an electrical-resistive heater platen for heating a container seal on containers fed to the sealing station; and
    (c) means for controlling the temperature of the heater platen comprising:
    a production rate sensor associated with said feed element for determing a dewell time of each container on the heater platen;
    a temperature sensor means for determining the temperature of the heater platen;
    an automatic mode circuit means for producing a first output responsive to said production rate sensor;
    a standby mode circuit means for producing a second output responsive to said first output;
    a heat controller means responsive to said temperature sensor and sid first and second outputs;
    a switching means for switching said heat controller into an automatic mode, wherein said heater controller is responsive to said production rate and said temperature sensor to provide sufficient heat to effect a proper seal of the container seal to the container, and for switching said heat controller into a standby mode, wherein said heat controller is responsive to said temperature sensor and a production rate of the spinwelder upon switching from automatic mode into standby mode to maintain the heater platen above a minimum standby temperature determined by a last previous production rate.

2. The spinwelder device as set forth in claim 1 further comprising a means for maintaining said heater element above a first predetermined minimum temperature when operating both in the standby mode and the automatic mode.

3. The spinwelder device of claim 2, wherein said maintaining means comprises a regulated voltage source connected to said automatic mode circuit mens and to said standby mode circuit means.

4. The spinwelder device as set forth in claim 1, further comprising a power control device responsive to said heat controller for supplying a regulated portion of a high voltage power source to said heater element.

5. The spinwelder device as set forth in claim 1, wherein said production rate sensor comprises a means for producing a signal proportional to a dwell time for said heater element and a converter means for transforming said signal into a DC signal input to said heat controller.

6. The spinwelder device as set forth in claim 1, further comprising a means for maintaining the heater element below a second predetermined maximum temperature when operating in the standby mode.

* * * * *